US011566716B2

(12) United States Patent
Tarte et al.

(10) Patent No.: US 11,566,716 B2
(45) Date of Patent: Jan. 31, 2023

(54) JUMP VALVE

(71) Applicants: Stephen Ray Tarte, Tampa, FL (US); Douglas Robert Ausdemore, Huntington Beach, CA (US)

(72) Inventors: Stephen Ray Tarte, Tampa, FL (US); Douglas Robert Ausdemore, Huntington Beach, CA (US)

( * ) Notice: Subject to any disclaimer, the term of this patent is extended or adjusted under 35 U.S.C. 154(b) by 540 days.

(21) Appl. No.: 16/417,563

(22) Filed: May 20, 2019

(65) Prior Publication Data

US 2019/0353261 A1    Nov. 21, 2019

Related U.S. Application Data

(60) Provisional application No. 62/673,224, filed on May 18, 2018.

(51) Int. Cl.
*F16K 15/02* (2006.01)
*F16K 15/10* (2006.01)
*F16K 15/06* (2006.01)

(52) U.S. Cl.
CPC .......... *F16K 15/026* (2013.01); *F16K 15/067* (2021.08); *F16K 15/10* (2013.01); *Y10T 137/7929* (2015.04)

(58) Field of Classification Search
CPC ........ F16K 15/03; F16K 15/06; F16K 15/063; F16K 15/066; F16K 15/067; F16K 15/026; F16K 15/025; F16K 1/465; F16K 15/10; Y10T 137/7837–7939; B01D 35/153; B01D 35/157; B01D 35/1573; B01D 35/1576; B01D 2201/167

USPC ....... 251/359–365; 137/469, 540.11, 543.23, 137/543, 21, 543.13, 540, 542, 533.27, 137/533.25, 543.15

See application file for complete search history.

(56) References Cited

U.S. PATENT DOCUMENTS

| | | | | |
|---|---|---|---|---|
| 920,716 A * | 5/1909 | Beckman | ................ | F16K 47/10 137/513.3 |
| 1,470,018 A * | 10/1923 | Love | ..................... | F16K 15/063 137/542 |
| 1,950,575 A * | 3/1934 | Smolensky | ........... | F16K 15/063 137/512.1 |
| 2,019,244 A * | 10/1935 | Bergesen, Sr. | .......... | F16K 15/08 137/902 |
| 2,409,220 A * | 10/1946 | Melichar | ................ | F16K 15/04 137/38 |
| 2,594,641 A * | 4/1952 | Griffith | ................ | F16K 15/063 137/543 |
| 2,623,725 A * | 12/1952 | Sands | ..................... | F16K 17/30 251/118 |
| 2,772,068 A * | 11/1956 | Grove | ..................... | F16K 3/246 251/332 |

(Continued)

*Primary Examiner* — Craig J Price
(74) *Attorney, Agent, or Firm* — William Simmons; Simmons Patents

(57) ABSTRACT

The invention relates to a mechanical valve assembly used to control a fluid (e.g., gas, liquid, etc.) to provide at least one of a check valve control feature and flow range control feature. When unwanted low flows are present, the valve remains closed and jumps open only at higher desired flow rates. The valve then closes when the forces at the input and output equalize, and the process repeats. Such allows fluid delivered to a flow meter in larger segregated bursts, rather than steady low flows that cause metering errors.

6 Claims, 10 Drawing Sheets

(56) References Cited

U.S. PATENT DOCUMENTS

| | | | | |
|---|---|---|---|---|
| 2,819,868 A * | 1/1958 | Cauffman | F16K 5/201 | 251/315.14 |
| 2,943,639 A * | 7/1960 | Smith | F16K 15/063 | 137/515.7 |
| 3,035,604 A * | 5/1962 | Portis | F16K 17/0466 | 251/332 |
| 3,051,196 A * | 8/1962 | Miller | F16K 15/063 | 137/516.29 |
| 3,083,723 A * | 4/1963 | Duchin | E03C 1/108 | 137/543 |
| 3,186,430 A * | 6/1965 | Koutnik | F16K 51/02 | 137/516.29 |
| 3,189,319 A * | 6/1965 | Bredtschneider | F16K 3/12 | 251/328 |
| 3,373,764 A * | 3/1968 | Munn | F16K 17/08 | 137/469 |
| 3,707,169 A | 12/1972 | Friedrichs | | |
| 3,770,001 A * | 11/1973 | Davis | F16K 15/048 | 137/217 |
| 4,015,626 A | 4/1977 | Thordarson | | |
| 4,766,930 A * | 8/1988 | Patti | F16K 15/026 | 137/540 |
| 4,979,721 A * | 12/1990 | Gilbert | F16K 27/0209 | 137/515.5 |
| 5,117,861 A * | 6/1992 | McConnell | F16K 15/06 | 137/515.7 |
| 5,265,643 A | 11/1993 | Golestan et al. | | |
| 5,503,549 A | 4/1996 | Iasella | | |
| 5,758,682 A * | 6/1998 | Cain | F16K 17/40 | 137/543.13 |
| 5,829,952 A * | 11/1998 | Shadden | F16K 15/021 | 417/547 |
| 6,959,718 B2 * | 11/2005 | Kayahara | F16K 31/0655 | 251/210 |
| 7,007,916 B2 | 3/2006 | Lee | | |
| 7,066,201 B2 * | 6/2006 | Chen | F16K 15/063 | 137/541 |
| 7,311,118 B2 * | 12/2007 | Doutt | F16K 15/044 | 137/15.18 |
| 7,334,603 B2 * | 2/2008 | Takeda | F16K 25/00 | 137/511 |
| 7,401,623 B2 * | 7/2008 | Roe | F04B 23/06 | 137/493 |
| 7,448,408 B2 * | 11/2008 | Yumoto | F16K 15/063 | 137/533.25 |
| 8,122,912 B2 | 2/2012 | Shemer et al. | | |
| 8,147,225 B2 * | 4/2012 | Kuny | F16K 15/063 | 137/543.13 |
| 8,230,875 B2 * | 7/2012 | Norman | F16K 15/063 | 137/542 |
| 9,683,674 B2 | 6/2017 | Super | | |
| 10,753,492 B2 * | 8/2020 | Yamamoto | B01D 35/153 | |
| 2006/0016494 A1 | 1/2006 | Irwin et al. | | |
| 2015/0300518 A1 * | 10/2015 | Hayashi | F16K 15/063 | 137/543.15 |
| 2019/0219182 A1 * | 7/2019 | Yamamoto | B01D 35/153 | |

\* cited by examiner

Typical Flow

Commonly observed inherent flow characteristic types

Delayed (clipped)
Flow Characteristics

JUMP VALVE

CLAIM TO PRIORITY

This application claims priority to U.S. Provisional application 62/673,224 filed on 18 May 2018, the contents of which are hereby incorporated by this reference for all that it discloses for all purposes.

TECHNICAL FIELD

The invention relates to a mechanical valve assembly used to control the flow of a gas or liquid to provide at least one of low flow control features and check valve control features.

BACKGROUND OF THE INVENTION

In physics and engineering, fluid dynamics is a subdiscipline of fluid mechanics that describes the flow of fluids (e.g., liquids, gases). Fluid dynamics has several subdisciplines, including aerodynamics and hydrodynamics. Fluid dynamics has a wide range of applications, including determining the mass flow rate of petroleum/water through pipelines, and such applications often require the use of a control valve.

A flow control valve regulates the flow or pressure of a fluid. Control valves normally respond to signals generated by independent devices such as flow meters or temperature gauges. Prior art control valves are normally fitted with actuators and positioners. Such valves are often referred to as automatic control valves as the hydraulic actuators respond to changes of pressure or flow to open/close the valve. Automatic control valves generally do not require an external power source, meaning that the fluid pressure is enough to open and close them.

Automatic control valves include check valves. A check valve is a type of valve which allows a fluid liquid or gas to flow in a forward direction only. In reverse flow conditions, the valve closes to prevent flow. Prior art inline check valves generally have two ports, an inlet and an outlet, with self-contained mechanical controls. The actuation of the valve is controlled by forward and reverse opposing forces. Forward forces may include upstream pressure, seat opposing forces, and flow forces when the flow is present. Opposing forces may include downstream pressure, inertia forces, and spring forces when a spring is present. The valve opens when upstream forces overcome downstream forces, and flow passes through the valve. Thus, check valves work automatically, and most are not directly controlled by a person or any external control.

An important concept in check valves is the "cracking pressure," or the point of minimum upstream pressure at which the valve will operate. Typically, the check valve is designed for, and can therefore be specified for, a specific cracking pressure. For prior art devices, the valve is in the fully open position at higher flow rates and operates at predictable pressure drops, and flow streams can be accurately predicted. However, at low flow conditions, the valve is only partially open, where the resulting flow rate is based on the percent of travel of the component that "opens" to allow flow.

Low flow conditions can be particularly troublesome for applications being metered by a flow meter with inter-moving parts for measurement elements measuring fluid flow. As the fluid passes through such a meter, the fluid flow activates the meter's measurement elements causing movement (e.g., spinning wheel or oscillating plate, etc.). Very Low Fluid flow rates can often have inefficient inertia for triggering the flow registering elements in devices such as flow meters. Such low flow simply passes through the meter without being metered, resulting in revenue loss to the entity metering the fluid consumption (typically a fluid supplier such as a utility company).

What is needed is a valve technology that prevents undesired low flow rates. Restated, the technology would prevent flow out of the valve at initial travel points (i.e., travel of the component that "opens") where the inertia of the fluid is insufficient to move a meters' measurement elements. Once a specific predefined travel setpoint is reached, the device should allow the flow to "jump up" to a range set by the associated travel.

The technology disclosed and claimed in this document teaches such a device.

SUMMARY OF THE INVENTION

Some of the objects and advantages of the invention will now be set forth in the following description, while other objects and advantages of the invention may be obvious from the description or may be learned through the practice of the invention.

One general object of the present invention is to provide a fluid control valve that prevents a predefined low flow rate while allowing a desired flow rate.

Another object of the present invention is to provide a flow control valve that prevents flow until a predefined flow rate is achieved downstream of the flow control valve so that the flow "jumps" from no flow to a higher flow rate that can be more accurately measured by a metering element.

Yet another object of the present invention is to provide a mechanical valve assembly used in the control of a fluid (e.g., gas, liquid, etc.) to provide a check valve control feature and flow range control feature. When unwanted low flows are present, the valve remains closed and jumps open only at the higher wanted rates. The valve then closes when the downstream flow stops. Flow is delivered to the flow meter in larger segregated bursts, rather than steady low flows at unwanted flow rates (i.e., low flow rates that cannot be measured by a meter).

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include but are not limited to the substitution of equivalent steps, referenced or discussed, and the functional, operational, or positional reversal of various features, steps, parts, or the like. Still, further, it is to be understood that different embodiments of this invention may include various combinations or configurations of presently disclosed features or elements, or their equivalents, including combinations of features or parts or configurations thereof not expressly shown in the figures or stated in the detailed description.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which refers to the appended figures, in which.

DISCLOSURE OF THE INVENTION

Detailed Description

Figure 1:
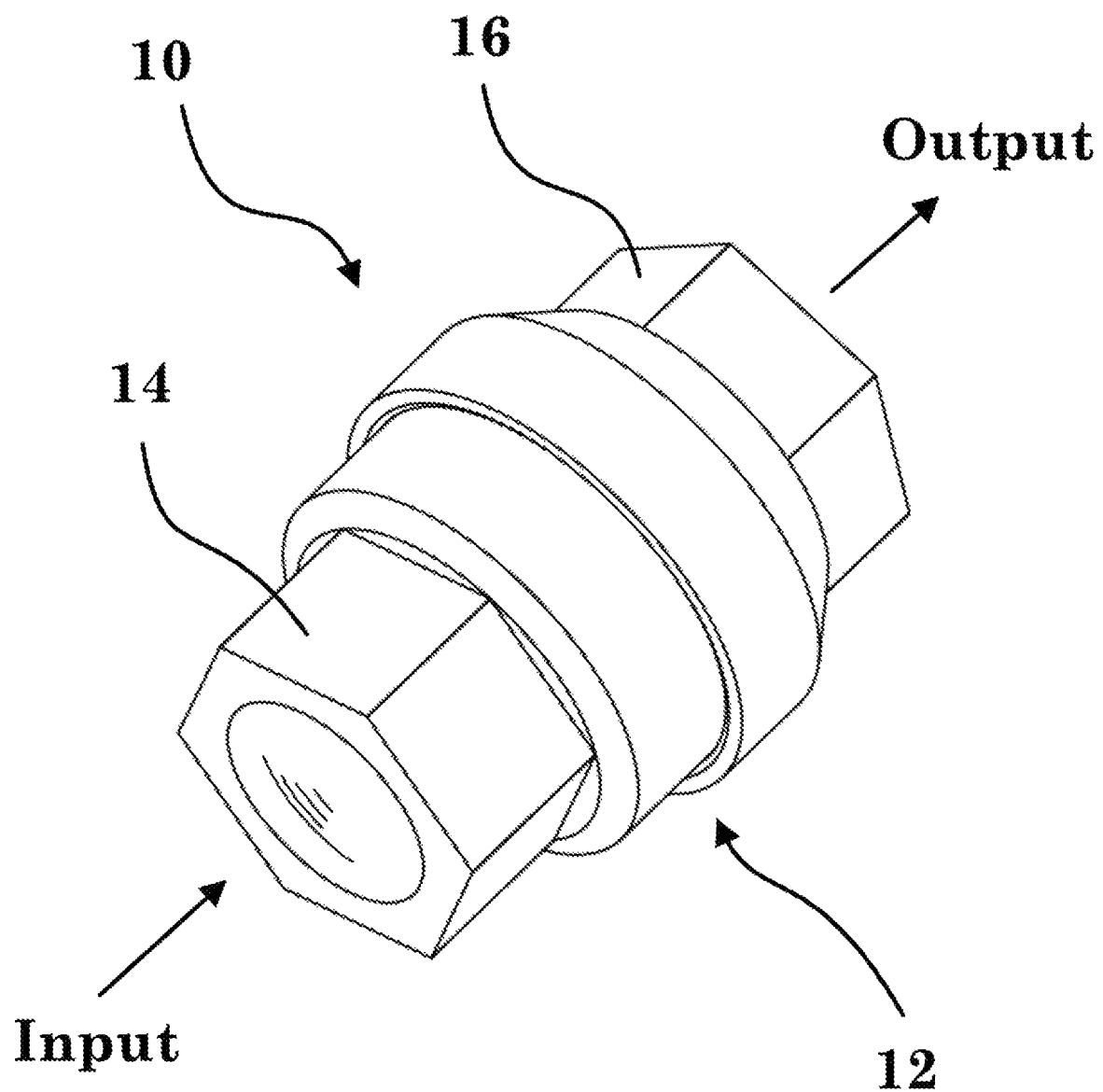
FIG. 1 presents a perspective view of an assembled flow control apparatus.

Reference now will be made in detail to the embodiments of the invention, one or more examples of which are set forth below. Each example is provided by way of explaining the invention, not the limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent the same or analogous features, elements or steps. It is to be understood by one of ordinary skill in the art that the present discussion is a description of exemplary embodiments only and is not intended as limiting the broader aspects of the present invention.

Construction Aids

For the purposes of this document, two or more items are "mechanically associated" by bringing them together or into a relationship with each other in any number of ways, including direct or indirect physical "releasable connections" such as snaps, screws, Velcro®, bolts, etc.—generally, connections designed to be easily and frequently released and reconnected, "hard-connections" such as welds, glue, rivets, macular bonds, generally connections that one does not anticipate disconnecting very often if at all and that are "broken" to separate, and/or "moveable connections" rotating, pivoting, oscillating, etc.

As used herein, unless stated otherwise, the terms "first," "second," and "third" may be used interchangeably to distinguish one component from another and are not intended to signify the location or importance of the individual components.

As used herein, the terms "upstream" and "downstream" refer to the relative location of components in a fluid pathway. For example, component A is upstream of component B if fluid flows from component A to component B. Conversely, component B is downstream of component A if component B receives a fluid flow from component A.

The actuation of the valve is controlled by forward and reverse opposing forces. Forward forces may include upstream pressure, seat opposing forces, and flow forces when the flow is present. Opposing forces may include downstream pressure, inertial forces, and spring forces when a spring is present.

As used herein, the term "axial" refers to a direction of flow through an object; the term "radial" refers to a direction extending away from the center of an object or normal to the "axial" direction, and the term "circumferential" refers to a direction extending around the circumference or perimeter of an object.

For the purposes of this document, unless otherwise stated, the phrase "at least one of A, B, and C" means there is at least one of A, or at least one of B, or at least one of C or any combination thereof not one of A, and one of B, and one of C. As used in the claims, the definite article "said" identifies required elements that define the scope of embodiments of the claimed invention, whereas the definite article "the" merely identifies environmental elements that provide context for embodiments of the claimed invention that are not intended to be a limitation of any claim.

This document includes headers that are used for place markers only. Such headers are not meant to affect the construction of this document, do not in any way relate to the meaning of this document, nor should such headers be used for such purposes.

While the examples herein may be directed to a water delivery system comprising a meter measuring water consumption, the disclose technology may be used to control the flow of any type of fluid delivery system.

Description

As noted previously, a check valve is a type of valve designed to allow a fluid (liquid or gas) to flow in a forward direction only. In reverse flow conditions, the valve closes to prevent flow. Inline prior art mechanical check valves are generally self-contained and have an inlet and an outlet port where the actuation of the valve is controlled by forward and reverse opposing forces. Forward forces include upstream pressure, seat opposing forces, and flow forces when the flow is present. Opposing forces include downstream pressure, inertia forces, and spring forces when a spring is present. When upstream forces overcome downstream forces, the valve opens, and fluid flows through the valve. For example, a utility may supply water to a home via a pipeline comprising a meter to measure consumption. Such utility is "upstream" from the home as the utility supplies fluid to the home. A check valve may also be placed into the pipeline so that fluid can only flow from the utility pipeline to the home.

Further, most flow meters depend on the inertial energy of the fluid flowing through the meter to activate the meter's flow measurement elements. During some low flow conditions, such fluid does not have enough inertial energy to start the flow measurement elements, and thus, such flow is not measured. Embodiments of the present invention may be referred to herein as a "jump valve" and is preferably configured to prevent undesired low flow rates for a fluid and may further provide a check valve feature.

Referring now to FIG. 1 through FIG. 10, embodiments of the present flow control apparatus 10 comprise a hollow cylindrical body 12 defined by an inlet body 14 axially disposed from an outlet body 16 wherein the inlet body 14 defines a releasable sealed association with the outlet body 16. Fluid flows into the inlet body 14 and out the outlet body 16. The sealing function may be achieved using any suitable means, including body sealing element 18 (FIG. 2), such as an O-ring. It will be appreciated by one of ordinary skill in the art that embodiments, where the inlet body 14 may define an inlet cap or the outlet body 16 may define an outlet cap fall within the scope and spirit of the invention. Further, the inlet body 14 may be releasably associated with the outlet body 16 in any number of ways, including a threaded association and a snapping association.

Figure 2:
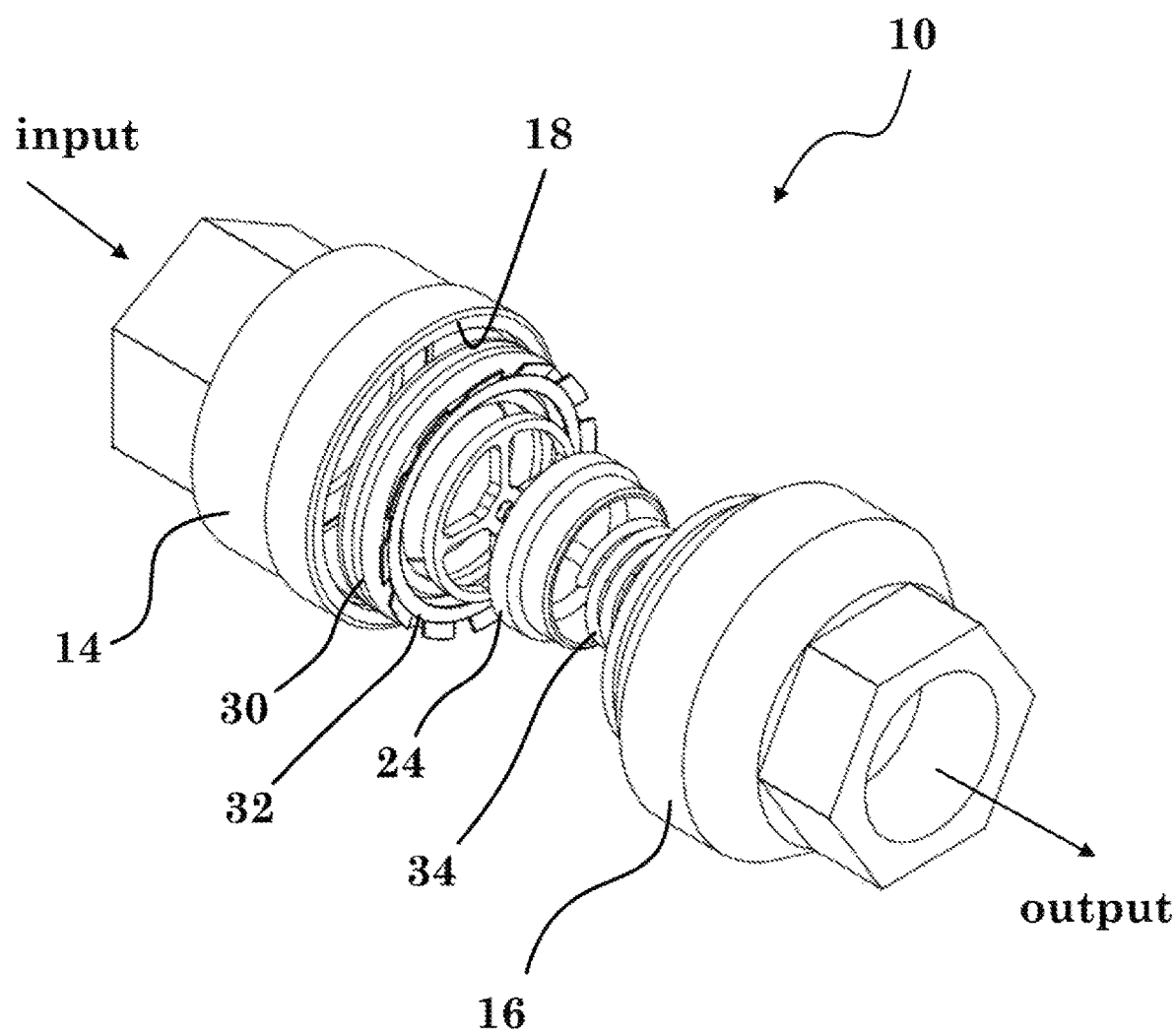
FIG. 2 present an output side exploded view of a flow control apparatus.
Figure 3:
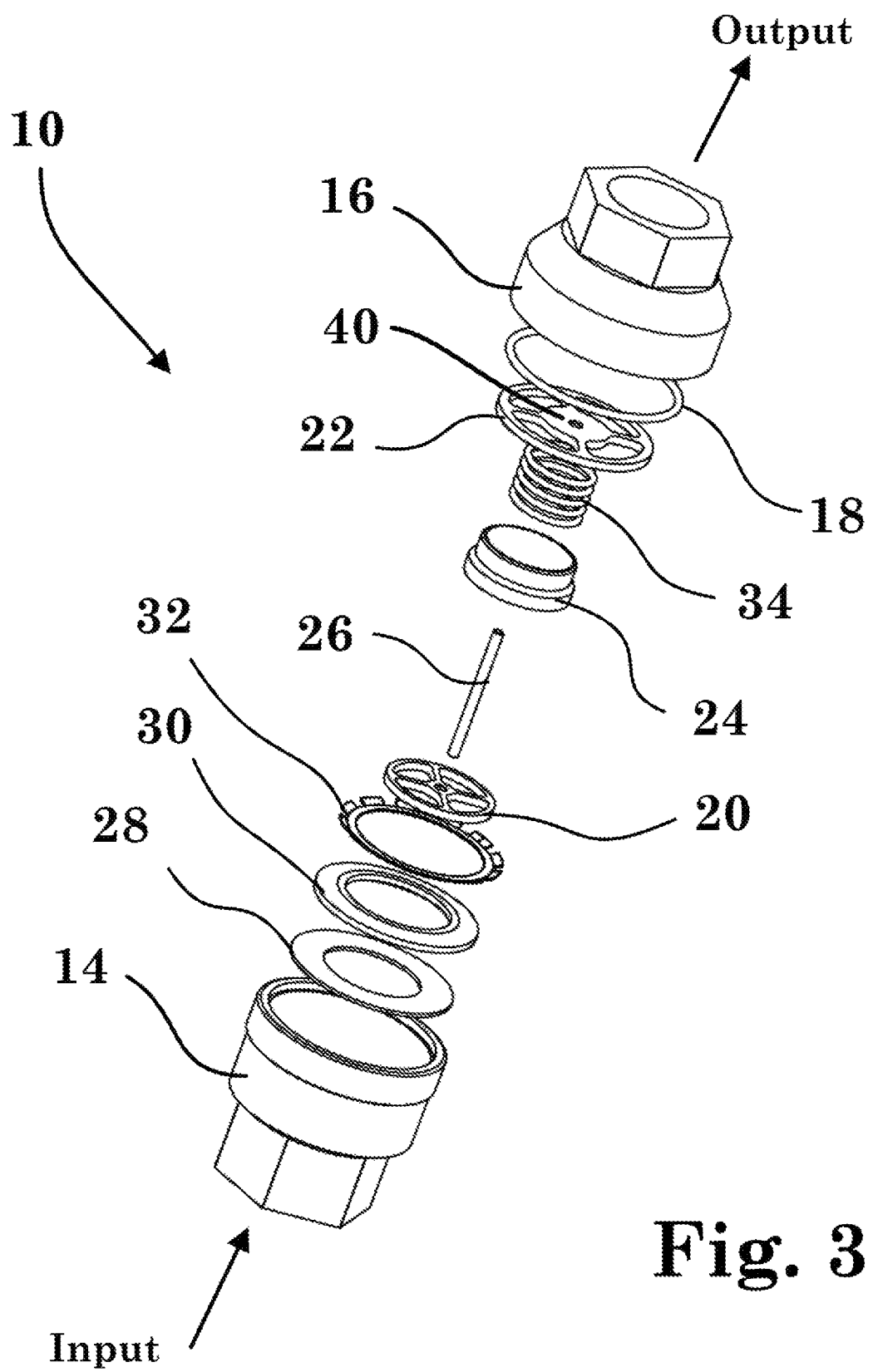
FIG. 3 present a perspective side exploded view of a flow control apparatus.

As depicted in FIG. 2 and FIG. 3, the cylindrical body 12 is configured for housing a plurality of flow control elements comprising an inlet plate 20, poppet element 24, stabilizer element 26, sealing member 28, dampening element 30, clamping element 32 and optional resilient element 34.

Figure 4:
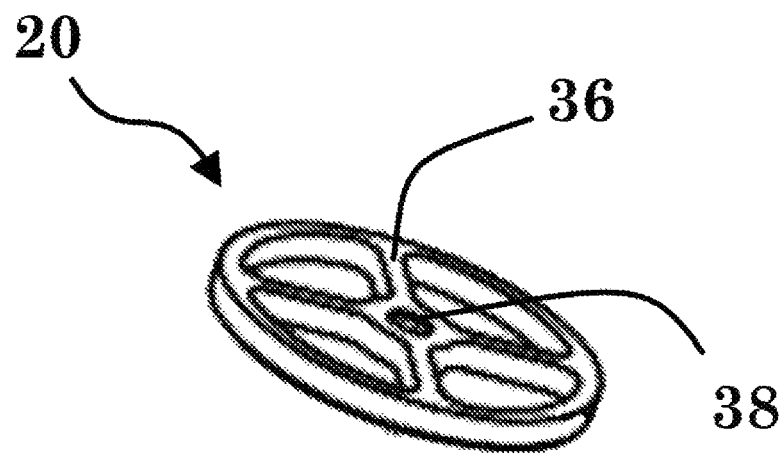
FIG. 4 presents an exemplary inlet plate.

As best seen in FIG. 3 and FIG. 4, the inlet plate 20 preferably defines a plurality of holes therethrough wherein the perimeter of the inlet plate 20 is one of integral to or mechanically associated with the inlet body 12. For example, inlet plate 20 may be pressed into the inlet body 14. The inlet plate 20 further defines a plurality of radially extending ribs 36 extending from its perimeter to an end point, defining an upstream stabilizer portion receiver 38. For the current embodiment, upstream stabilizer portion receiver 38 defines a hole. Similarly, the outlet plate 22 defines a plurality of holes therethrough wherein the perimeter of the outlet plate 22 is one of integral to or mechanically associated with the outlet body 16. As with the inlet plate 20, the outlet plate 22 defines a plurality of radially extending ribs extending from its perimeter to an end point, defining a downstream stabilizer portion receiver 40. The outlet plate 22 may or may not be pressed into the outlet body 14.

All the fluid flowing through the flow control apparatus 10 may flow through the plurality of holes defined by the inlet plate 20 and outlet plate 22. Ideally, the total area of such plurality of holes (for each plate) is greater than the inner diameter of the supply pipe to be associated with the inlet body 14 and/or the outlet body 16.

A core element 24 is now considered in more detail. One embodiment of a core element is poppet element 24, which defines a circular perimeter defining a poppet diameter and wherein the poppet element 24 further defines an upstream face 42 and (for some embodiments) an opposing downstream resilient element receiver 44. At least a portion of the upstream face defines a poppet face seal zone 46, and at least a portion of the perimeter defines a circumferential poppet perimeter flow zone 48.

Figure 5:
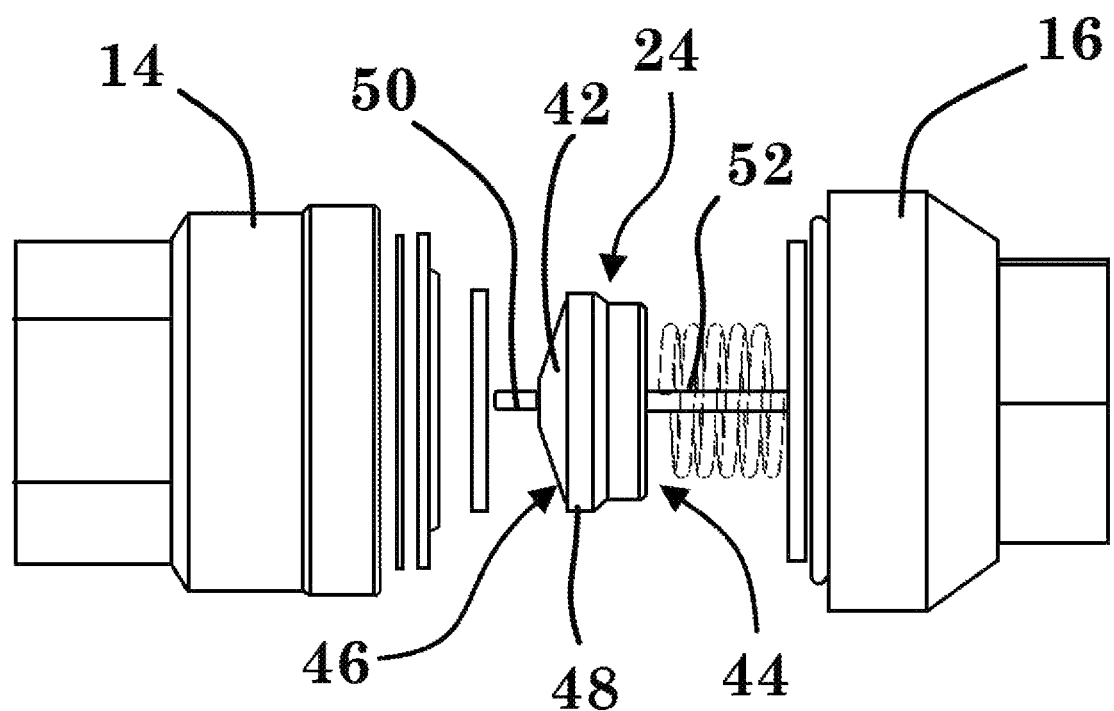
FIG. 5 presents a side elevational exploded view of a flow control apparatus.

As best seen in FIG. 3 and FIG. 5, the poppet element 24 may define an integral stabilizer element 26 or be mechanically associated with a stabilizer element 26. One embodiment of a stabilizer element 26 is a rod that extends through the poppet element 24, defining an upstream stabilizer portion 50 and a downstream stabilizer portion 52, wherein said upstream stabilizer portion 50 is axially movably associated with the upstream stabilizer portion receiver 38. Similarly, the downstream stabilizer portion 52 is axially movably associated with the downstream stabilizer portion receiver 40 to allow axial movement of the poppet element 24 while limiting the radial movement of the poppet element 24. Ideally, all radial movement is prevented, and the poppet element 24 simply slides axially inside hollow body 10 in response to delta forces on the inlet side and outlet side.

For the purposes of this invention, the delta force is defined as the inlet side forces minus the outlet side forces. When the delta forces are positive, the poppet element 24 moves in the downstream direction until it reaches a fully open limit. When the delta forces are negative, the poppet element 24 moves in the upstream direction until it reaches a fully closed limit.

Figure 8:
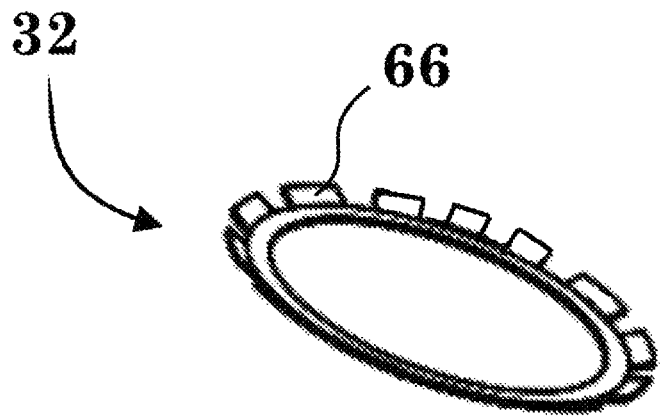
FIG. 8 presents a perspective view of an exemplary clamping element.
Figure 6:
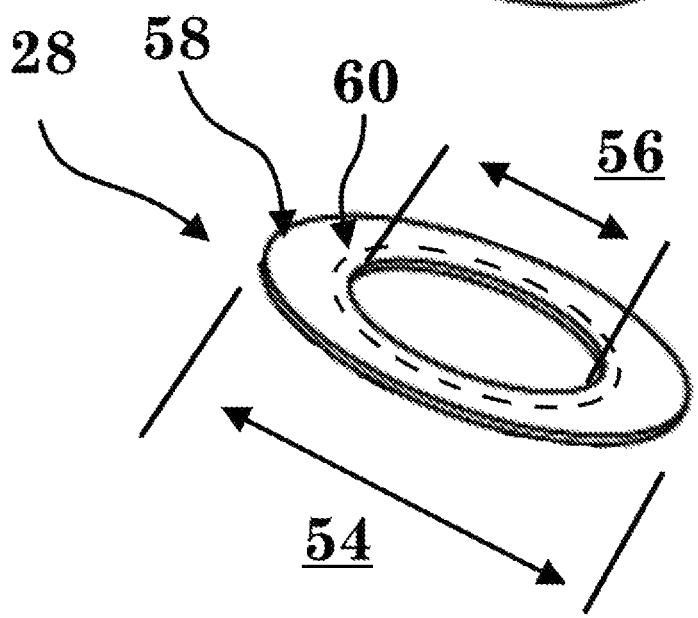
FIG. 6 presents a perspective view of an exemplary sealing member.
Figure 9:
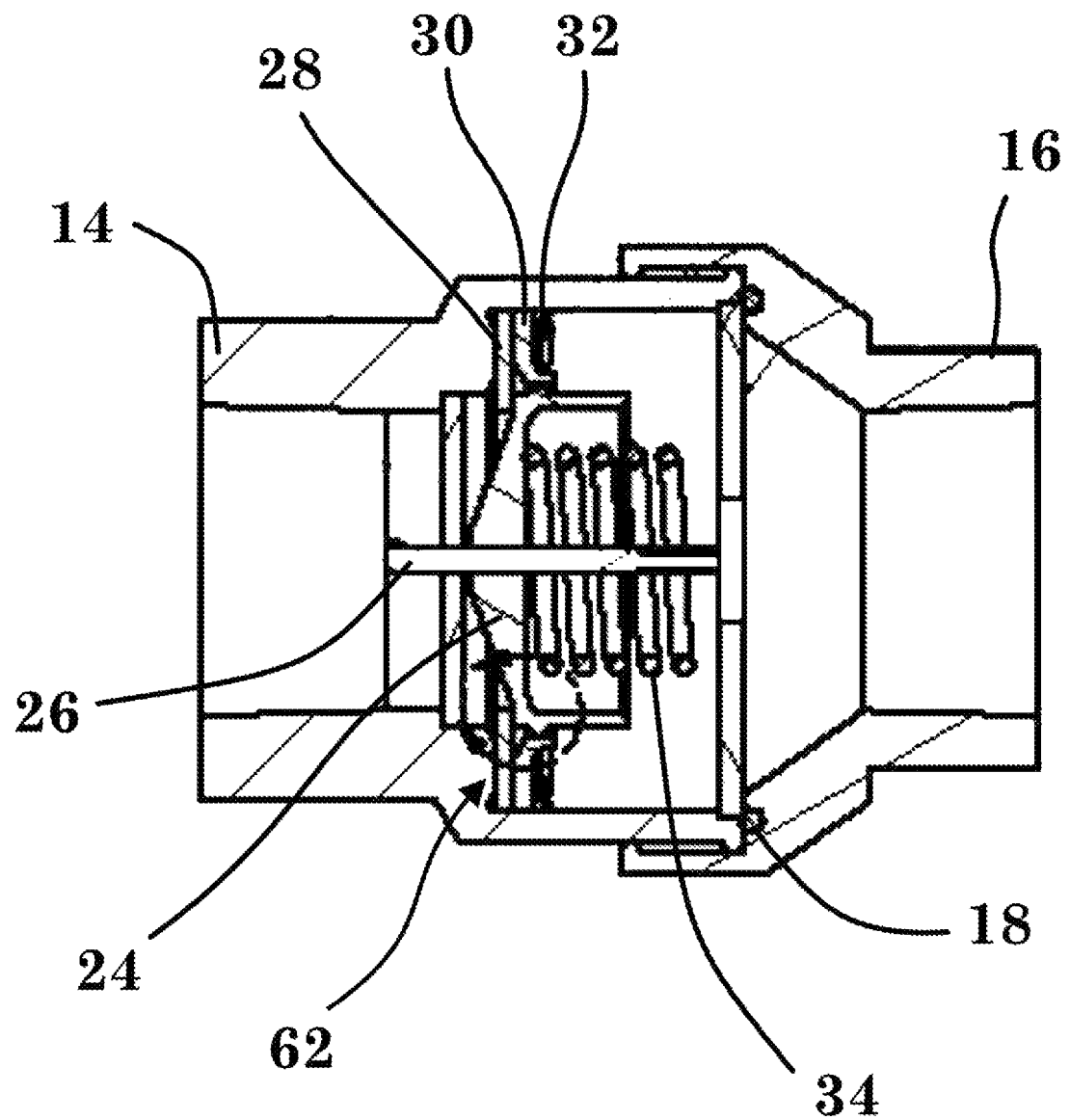
FIG. 9 presents a side elevational view of flow control apparatus with the body cutaway to show internal components.
Figure 10:
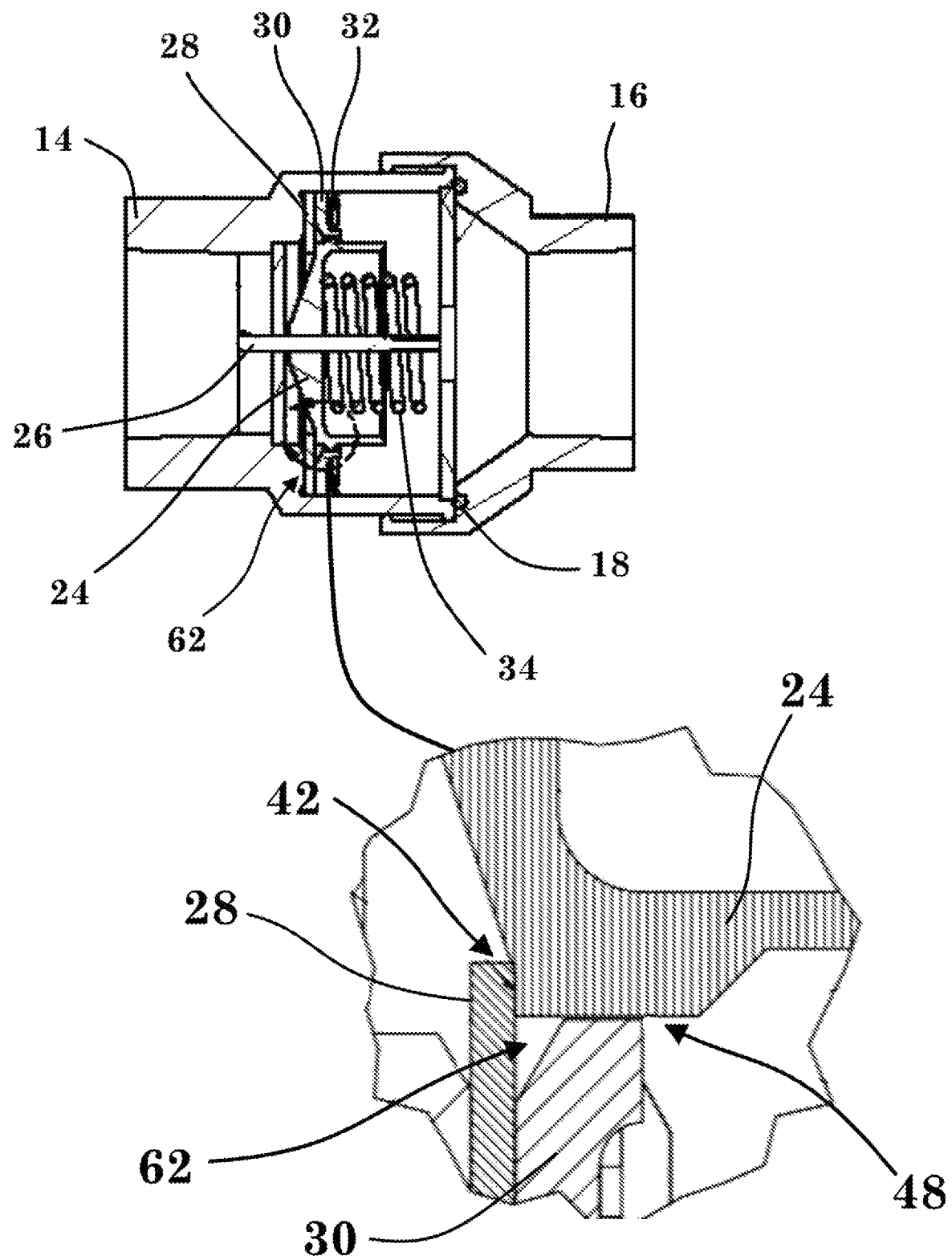
FIG. 10 presents a closeup view of some of the internal components depicted in FIG. 9.

As best seen in FIG. 3, FIG. 6 and FIG. 9, a circular sealing member 28 defines a void therethrough, thereby defining an outer sealing member diameter 54 and an inner sealing member diameter 56. As best seen in FIG. 8, the sealing member may be disposed inside the inlet body so that the outer perimeter of the sealing member 28 defines a seal with an inner surface of the inlet body 12. The inner diameter 56 is smaller than the poppet diameter so that at least a portion of the downstream face 58 comes in contact with the upstream face 42 of poppet element 24 when the valve is closed. Thus, at least a portion of the downstream face 58 provides a sealing engagement zone configured to provide a sealing engagement with the poppet face seal zone 46.

For one embodiment, the sealing member 28 is flexible and resilient to allow small backflow amounts in response to sudden pressure changes such as pressure changes caused by water hammer. Such a configuration helps to limit damage to components in the fluid delivery system and associated meter that would otherwise be caused by water hammer. For one alternative embodiment, the sealing member 28 is more rigid and prevents backflow providing a traditional backflow check valve feature.

Figure 7:
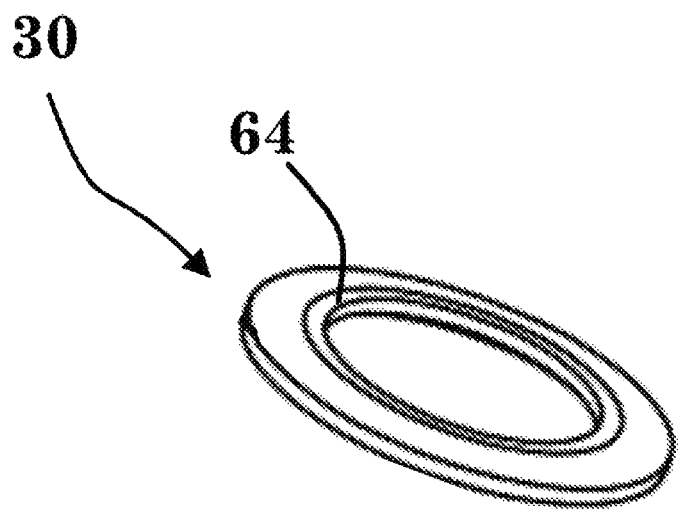
FIG. 7 presents a perspective view of an exemplary dampening element.

Similarly, as best seen in FIG. 3, FIG. 7 and FIG. 9, the circular dampening element 30 defines a circular void therethrough, thereby defining an outer dampening element diameter and an inner dampening element dimeter. The dampening element 30 is disposed adjacent to and downstream of the sealing member 28. At least a portion of the inner perimeter of the dampening element defines a dampening flow zone configured for being in fluid communication with the poppet perimeter flow zone 48 to define a dampening flow area 62 (best seen in FIG. 10). For one embodiment, the inner perimeter of the dampening element defines a lip 64. Such interface between the dampening element 30 and the perimeter of the poppet element 24 allows a small fluid flow to pass through such zone during low flow conditions.

Similar to the sealing member 28 and dampening element 30, as best seen in FIG. 3, FIG. 8 and FIG. 9, a circular clamping element 32 defines a circular void therethrough, thereby defining a clamping element inner diameter and a clamping element outer diameter. The clamping element 32 may be disposed adjacent to and downstream of the dampening element 30 wherein the outer perimeter of the clamping element 32 defines a plurality of body interface elements 66 configured to mechanically associate with an inner surface of the inlet body 14 to hold the sealing member 28 and the dampening element 30 in place inside the inlet body 14.

Based on the above disclosure, one of ordinary skill in the art will appreciate that when the poppet face seal zone 46 is engaging the sealing engagement zone 60, the fluid delta forces have reached a predefined first value (basically, they cancel, and there is no delta). In this state, the flow control apparatus 10 is in the full closed position, and there should be no fluid flow through the hollow body 12. When the fluid delta forces increase to a second predefined value (as a result of a very low flow downstream the outlet body), the poppet element 24 moves slightly in the downstream direction and a small amount of fluid flows through the dampening zone but not through the inlet body 14. Eventually, the pressure delta will reach a third predefined value, and the poppet face seal zone 46 disengages with said sealing element zone 60, allowing a pulse of fluid flow through the meter until the delta forces equalize again and the valve closes, preventing flow out of the outlet body. Such is an example of an undesired low flow condition being converted to a higher pulse flow. The poppet element 24 will move even further in the downstream direction so that the dampening flow zone disengages with said poppet perimeter flow zone 48 when the fluid delta forces exceed a predefined third value, thereby allowing fluid flow through said hollow cylindrical body.

Stated differently, suppose a water utility supplies water to a customer through a water meter associated with the disclosed flow control apparatus 10. Suppose the customer has a shower that leaks a drip at a time resulting in a low flow rate that cannot be measured by the water meter. As the pressure on the output side drops slowly as water is drained from the dampening flow area due to the dripping leak, the poppet element moves slightly in the downstream direction. Eventually, the low flow will cause the pressure on the output side of the flow control apparatus to drop so much that the poppet element will disengage from the dampening element allowing fluid flow out the flow control apparatus to "jump" to a predefined value that can be measured by the meter. Such "jump" flow will replenish the fluid lost due to the leak, and input and output pressure will equalize, the valve will close, and the process will start all over again. For example, if the customer should turn on the shower, the resulting high flow rate will cause the flow control apparatus to fully open and stay open until the shower is turned off.

Valve Operation Charts

Figure 11:
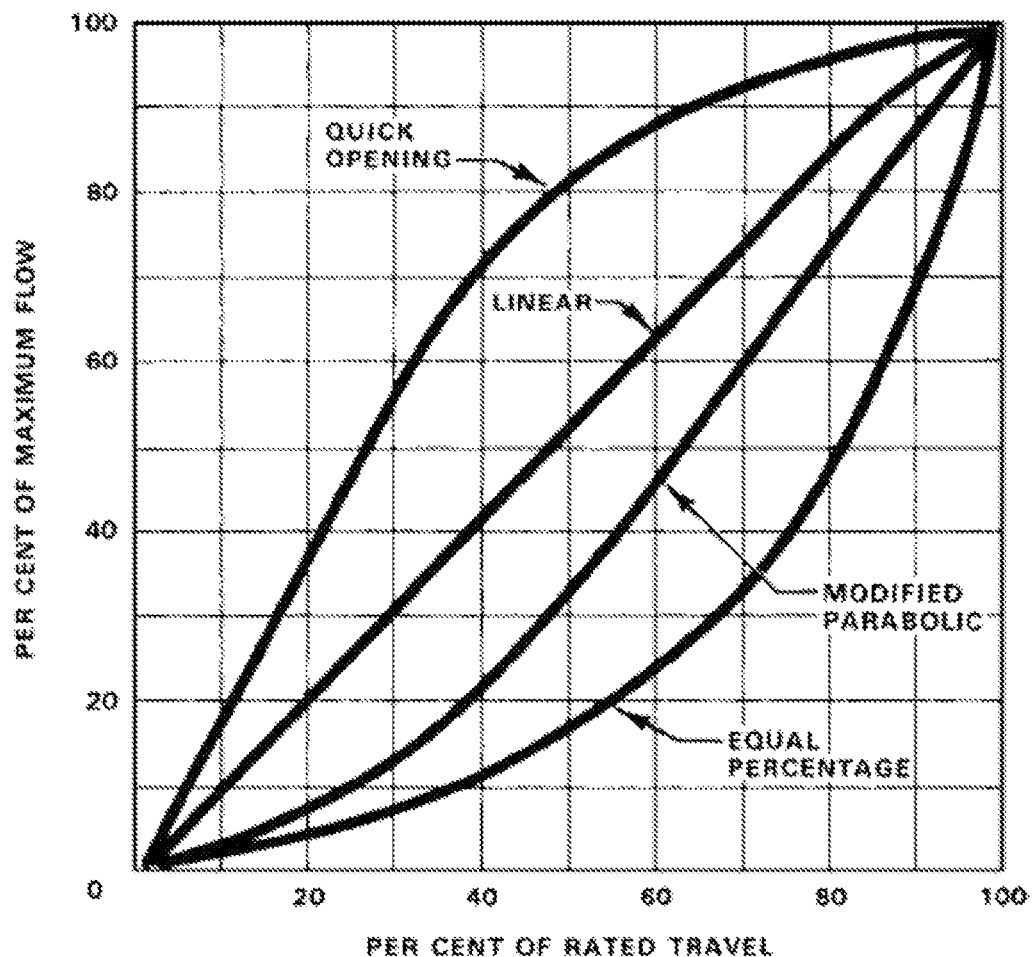
FIG. 11 shows some typical flow patterns of Flow vs. Opening Travel for a typical prior art check valves.
Figure 12:
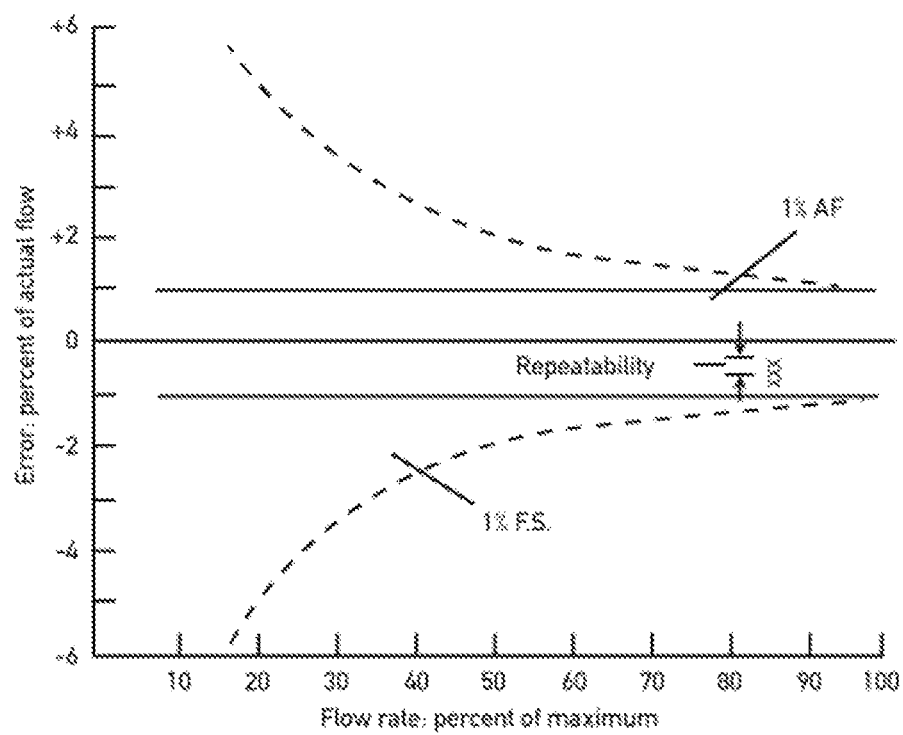
FIG. 12 illustrates the effect of flow rate on fluid meter accuracy.
Figure 13:
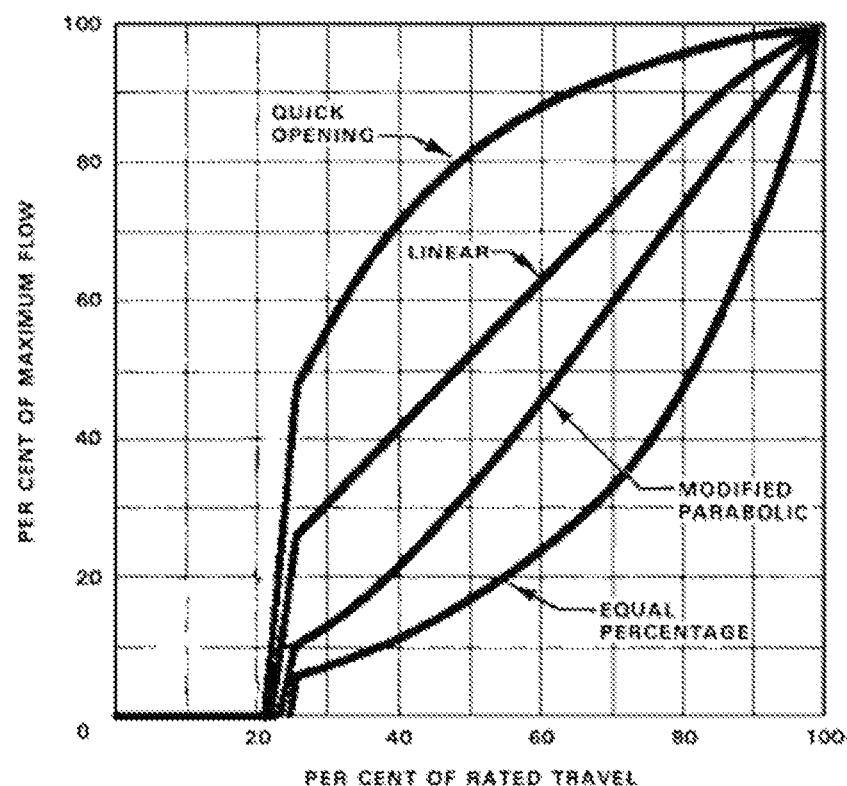
FIG. 13 shows some typical flow patterns of Flow vs. Opening Travel for a typical prior art check valve modified to comprise the disclosed technology.

Referring now to FIG. 11, FIG. 12 and FIG. 13, charts depicting exemplary flow conditions and associated metering error are presented. FIG. 11 presents a graph of the typical flow patterns for Flow v. Opening Travel for various types of prior art valves, including quick opening, linear, modified parabolic, and equal percentage. At high flow rates, the valves are fully open and operate at predictable pressure drops, and flow streams can be accurately predicted and measured. At low flow conditions, the valves are partially open, and at very low flow rates, the flow stream is less predictable, making accurate flow measurements materially more difficult. Thus, flow meter accuracy for a particular meter generally depends on flow rates. Indeed, for some meters, very low flow rates can be unmeasurable.

FIG. 12 presents typical accuracy ranges for many types of fluid flow meters. A lower number is more accurate (i.e., 1% error is better than 2% error). As can be seen, accuracy drops off quickly below 40% and even more quickly below 20% of the maximum flow rate. Thus, meter accuracy for such meters can be materially improved if flow rates below 20% of maximum can be eliminated (or even 40%).

Referring now to FIG. 13, a graph is presented showing typical flow patterns for Flow v. Opening Travel for quick opening, linear, modified parabolic, and equal percentage valves comprising the disclosed invention. For the example in FIG. 13, fluid flow through the valve is clipped below 20 percent travel of the valve component. Thus, the flow "jumps up" from no flow to a predefined low flow value that can be accurately measured by an associated meter.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A flow control apparatus configured to prevent a predefined low flow rate for a fluid, said flow control apparatus comprising:

a hollow cylindrical body comprising an inlet body axially disposed from an outlet body wherein said inlet body defines a releasable sealed association with said outlet body;

an inlet plate defining an inlet plate outer perimeter, an inlet plate inner perimeter, a plurality of radially extending ribs extending from the inlet plate inner perimeter to an inlet plate end point at the center of the inlet plate thereby defining a plurality of holes through the inlet plate, and wherein the inlet plate end point further defines an upstream stabilizer portion receiver and wherein the inlet plate outer perimeter is one of integral to or mechanically associated with said inlet body;

an outlet plate defining an outlet plate outer perimeter, an outlet plate inner diameter, a plurality of radially extending ribs extending from the outlet plate inner perimeter to an outlet plate end point at the center of the outlet plate thereby defining a plurality of holes through the outlet plate, and wherein the outlet plate outer perimeter is one of integral to or mechanically associated with said outlet body, and wherein the outlet plate end point further defines a downstream stabilizer portion receiver;

a poppet element defining a circular perimeter defining a poppet diameter and wherein said poppet element further defines an upstream face defining a poppet face seal zone and wherein at least a portion of said circular perimeter defines a poppet perimeter flow zone;

a stabilizer element extending through the poppet element thereby defining an upstream stabilizer portion and a downstream stabilizer portion wherein said upstream stabilizer portion is axially movably associated with said upstream stabilizer portion receiver and said downstream stabilizer portion is axially movably associated with said downstream stabilizer portion receiver to allow axial movement of said poppet element while limiting radial movement of said poppet element;

a circular sealing member defining an outer sealing member perimeter, a downstream face, an opposing upstream face, and further defining a void therethrough thereby defining an outer sealing member diameter and an inner sealing member diameter and wherein said circular sealing member is disposed inside said inlet body so that the outer sealing member perimeter engages an inner surface of said inlet body to form a seal and wherein at least a portion of the downstream face provides a sealing engagement zone configured to provide a sealing engagement with said poppet face seal zone and wherein said inner sealing member diameter is less than the poppet diameter;

a circular dampening element having an outer dampening element perimeter, a dampening element inner perimeter, a downstream face, an opposing upstream face, and further defining a circular void therethrough thereby defining an outer dampening element diameter and an inner dampening element diameter wherein said dampening element is disposed adjacent to and downstream of said circular sealing member and wherein at least a portion of said dampening element inner perimeter defines a dampening flow zone configured to be in fluid communication with said poppet perimeter flow zone to define a dampening flow area; and a circular clamping element defining a circular void therethrough thereby defining a clamping element inner diameter and a clamping element outer diameter wherein said clamping element is disposed adjacent to and downstream of said dampening element and wherein said clamping element outer diameter defines a plurality of body interface elements configured to mechanically associate with an inner surface of said inlet body to hold said circular sealing member and said circular dampening element in place inside said inlet body.

2. The flow control apparatus as in claim 1, wherein inlet plate defines four radially extending ribs and wherein said inlet plate is pressed into said inlet body.

3. The flow control apparatus as in claim 2, wherein said outlet plate defines four radially extending ribs.

4. The flow control apparatus as in claim 1, wherein said a sealing member defines at least a partially elastomeric seal that flexes.

5. The flow control apparatus as in claim 1, further comprising a resilient element disposed between said poppet element and said outlet plate configured to generate an upstream directed bias force on said poppet element.

6. The flow control apparatus as in claim 1, wherein the inner diameter of said circular dampening element defines a lip.

* * * * *